(12) United States Patent
Furuno et al.

(10) Patent No.: US 10,610,832 B2
(45) Date of Patent: Apr. 7, 2020

(54) COMPOSITE SEMIPERMEABLE MEMBRANE

(71) Applicant: TORAY INDUSTRIES, INC., Tokyo (JP)

(72) Inventors: Shuji Furuno, Shiga (JP); Hiroho Hirozawa, Shiga (JP); Takao Sasaki, Shiga (JP); Yoshiki Okamoto, Shiga (JP); Hiroyuki Yamada, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 256 days.

(21) Appl. No.: 15/763,299

(22) PCT Filed: Sep. 27, 2016

(86) PCT No.: PCT/JP2016/078493
§ 371 (c)(1),
(2) Date: Mar. 26, 2018

(87) PCT Pub. No.: WO2017/057378
PCT Pub. Date: Apr. 6, 2017

(65) Prior Publication Data
US 2018/0264413 A1    Sep. 20, 2018

(30) Foreign Application Priority Data
Sep. 28, 2015 (JP) ................ 2015-189491

(51) Int. Cl.
| | | |
|---|---|---|
| *B01D 69/12* | (2006.01) | |
| *B01D 69/10* | (2006.01) | |
| *B01D 71/56* | (2006.01) | |
| *C02F 1/44* | (2006.01) | |
| *C02F 103/08* | (2006.01) | |

(52) U.S. Cl.
CPC ............ *B01D 69/12* (2013.01); *B01D 69/10* (2013.01); *B01D 71/56* (2013.01); *C02F 1/44* (2013.01);
(Continued)

(58) Field of Classification Search
CPC ........ B01D 69/10; B01D 69/12; B01D 71/56; C02F 1/44; C02F 2103/08; Y02A 20/131
See application file for complete search history.

(56) References Cited

U.S. PATENT DOCUMENTS

| | | | |
|---|---|---|---|
| 5,112,487 A | 5/1992 | Himeshima et al. | |
| 5,324,538 A | 6/1994 | Takahashi et al. | |

(Continued)

FOREIGN PATENT DOCUMENTS

| | | |
|---|---|---|
| JP | 5-76740 A | 3/1993 |
| JP | 2819713 B2 | 11/1998 |

(Continued)

OTHER PUBLICATIONS

International Search Report, issued in PCT/JP2016/078493, PCT/ISA/210, dated Jan. 10, 2017.

(Continued)

*Primary Examiner* — John Kim
(74) *Attorney, Agent, or Firm* — Birch, Stewart, Kolasch & Birch, LLP

(57) ABSTRACT

The purpose of the present invention is to provide a composite semipermeable membrane having achieved both strength and water-permeable properties. This composite semipermeable membrane is provided with a substrate, a porous support body disposed on the substrate, and a separation function layer provided on the porous support body. The substrate has a structure provided with a crimped portion and a non-crimped portion. The porous support body is impregnated inside a crimped portion and inside a non-crimped portion of the substrate.

6 Claims, 1 Drawing Sheet

(52) U.S. Cl.
CPC ......... *C02F 2103/08* (2013.01); *Y02A 20/131* (2018.01)

(56) References Cited

U.S. PATENT DOCUMENTS

| | | |
|---|---|---|
| 2013/0175214 A1 | 7/2013 | Takagi et al. |
| 2013/0334128 A1 | 12/2013 | Takagi et al. |
| 2015/0068971 A1 | 3/2015 | Koiwa et al. |

FOREIGN PATENT DOCUMENTS

| | | |
|---|---|---|
| JP | 2010-99591 A | 5/2010 |
| JP | 2010-125418 A | 6/2010 |
| JP | 2012-130890 A | 7/2012 |
| JP | 2012-187574 A | 10/2012 |
| WO | WO 2012/033086 A1 | 3/2012 |
| WO | WO 2012/091027 A1 | 7/2012 |
| WO | WO 2015/048442 A1 | 4/2015 |

OTHER PUBLICATIONS

Written Opinion of the International Searching Authority, issued in PCT/JP2016/078493, PCT/ISA/237, dated Jan. 10, 2017.
Extended European Search Report dated May 3, 2019 for Application No. 16851549.2.
Maruf et al., "Use of nanoimprinted surface patterns to mitigate colloidal deposition on ultrafiltration membranes", Journal of Membrane Science, vol. 428, 2013, pp. 598-607.

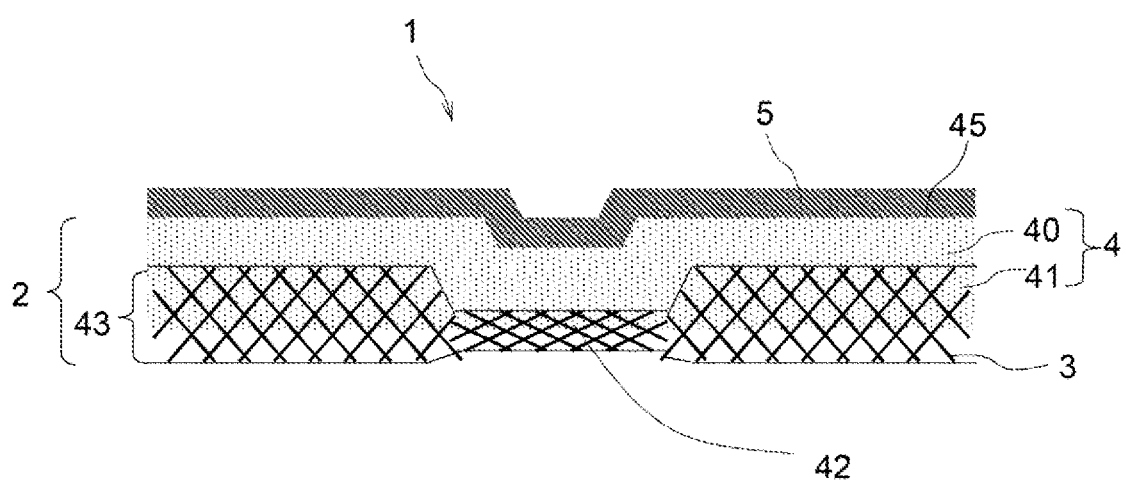

COMPOSITE SEMIPERMEABLE MEMBRANE

TECHNICAL FIELD

The present invention relates to a composite semipermeable membrane useful for selective separation of a liquid mixture. The composite semipermeable membrane obtained by the present invention is suitable for, e.g. desalination of seawater or brackish water.

BACKGROUND ART

With regard to mixture separation, there are various techniques for removing substances (e.g., salts) dissolved in a solvent (e.g., water). Utilization of membrane separation techniques as a process for saving energy and resources is expanding in recent years. Examples of membranes usable in the membrane separation techniques include a microfiltration membrane, ultrafiltration membrane, nanofiltration membrane, and reverse osmosis membrane. These membranes are used in the case of obtaining drinking water from, for example, seawater, brackish water, or water containing a harmful substance, and for producing industrial ultrapure water, wastewater treatments, recovery of valuables, etc.

Most of the currently commercially available reverse osmosis membranes and nanofiltration membranes are composite semipermeable membranes, which are divided into two types: one type has a gel layer and an active layer including a crosslinked polymer on a supporting membrane; and the other type has an active layer formed by polycondensing monomers on a supporting membrane. Among these, a composite semipermeable membrane obtained by coating a supporting membrane with a separation functional layer including a crosslinked polyamide obtained by polycondensation reaction of a polyfunctional amine and a polyfunctional acid halide is widely used as a separation membrane having high permeability and high selectively separating properties (Patent Documents 1 and 2).

A composite semipermeable membrane is configured of a supporting membrane including a substrate and a porous support and a separation functional layer formed on the supporting membrane. A step of producing the composite semipermeable membrane involves winding in which the front surface of the composite semipermeable membrane, which is the surface of the separation functional layer, comes into contact with the back surface of the membrane, which is the surface of the substrate. In case where the porous support excessively infiltrates into the substrate to reach the back surface, which is the surface of the substrate, the porous support that has reached the back surface may stick to the separation functional layer or be rubbed against the separation functional layer to cause damage thereto. Meanwhile, in case where the substrate is made to have an excessively high bulk density in order to prevent the porous support from excessively infiltrating to reach the back surface, which is the surface of the substrate, the porous support does not sufficiently infiltrate into this substrate, resulting in peeling and membrane damage to make it impossible to obtain a satisfactory salt removal ratio.

Patent Document 3 discloses a composite semipermeable membrane having a surface with recesses and protrusions which have a maximum surface level difference of 0.1-1.2 mm, as a sheet-shaped separation membrane in which flow channels can be sufficiently ensured on the membrane surface and the membrane surface sufficiently produces a turbulent effect to render local unevenness in flow less apt to occur.

Patent Document 4 discloses a separation membrane having recesses and protrusions and a separation membrane element which are effective in improving the separation/removal performance, improving separation membrane performances, such as increasing the permeation flow rate per unit time, and improving the resistance to chemicals such as acids and alkalis.

BACKGROUND ART DOCUMENTS

Patent Documents

Patent Document 1: Japanese Patent No. 2819713
Patent Document 2: JP-A-5-76740
Patent Document 3: JP-A-2010-125418
Patent Document 4: WO 12/033086

SUMMARY OF THE INVENTION

Problems that the Invention is to Solve

Despite the various proposals described above, there has been no composite semipermeable membrane which sufficiently combines strength and permeability. An object of the present invention is to provide a composite semipermeable membrane which includes a substrate having press-bonded parts and hence enables the membrane surface to sufficiently produce a turbulent effect and which includes a porous support moderately prevented from having impregnated into the substrate to reach the back surface. This composite semipermeable membrane has durability while retaining salt rejection performance.

Means for Solving the Problems

In order to achieve the above object, the present invention has the following constitution:

(1) A composite semipermeable membrane including a substrate, a porous support provided on the substrate, and a separation functional layer disposed on the porous support, in which the substrate has a structure including press-bonded parts and non-press-bonded parts, the press-bonded parts being present in a proportion of up to 50% per unit area of the substrate, the porous support impregnated into the press-bonded parts of the substrate has a weight of 0.1 g/m$^2$-2 g/m$^2$, and the porous support impregnated into the non-press-bonded parts of the substrate has a weight of 3 g/m$^2$-20 g/m$^2$.

(2) The composite semipermeable membrane according to claim 1, wherein a proportion of the press-bonded parts of the substrate is 5%-50% per unit area of the substrate.

(3) The composite semipermeable membrane according to any one of claims 1 to 3, wherein the non-press-bonded parts of the substrate have a thickness of 40 μm-150 μm, the substrate has a basis weight of 40 g/m$^2$-100 g/m$^2$, and the substrate comprises a polyester as a main component.

(4) The composite semipermeable membrane according to any one of claims 1 to 3, wherein the non-press-bonded parts of the substrate have a thickness of 40 μm-150 μm, the substrate has a basis weight of 40 g/m$^2$-100 g/m$^2$, and the substrate comprises a polyester as a main component.

(5) The composite semipermeable membrane according to any one of claims 1 to 4, wherein a difference in thickness between the press-bonded parts and the non-press-bonded parts of the substrate is 10 μm-95 μm.

(6) The composite semipermeable membrane according to any one of claims 1 to 5, wherein the separation functional layer comprises a polyamide.

Advantage of the Invention

The present invention enables a composite semipermeable membrane for use as a separation membrane to combine strength and permeability.

BRIEF DESCRIPTION OF THE DRAWINGS

FIG. 1 is a cross-sectional view of one embodiment of the composite semipermeable membrane of the present invention.

MODE FOR CARRYING OUT THE INVENTION

1. Composite Semipermeable Membrane

The composite semipermeable membrane of the present invention includes: a supporting membrane including a substrate and a porous support; and a separation functional layer disposed on the porous support of the supporting membrane.

(1-1) Supporting Membrane

The supporting membrane has substantially no ability to separate ions or the like, and is intended to impart strength to the separation functional layer, which substantially has separation performance. The supporting membrane includes a substrate and a porous support. The porous support has been provided on the substrate so that some of the porous support has impregnated into the substrate. The substrate and the porous support have been thus superposed integrally.

The substrate is preferably porous. Examples thereof include fabrics made of polymers such as polyester-based polymers, polyamide-based polymers, polyolefin-based polymers, and mixtures or copolymers thereof. Among these, polyester-based polymers are preferred because they allow formation of supporting membranes superior in mechanical strength, heat resistance, water resistance, etc.

Polyester-based polymers are polyesters each produced from an acid component and an alcohol component. As the acid component, aromatic carboxylic acids such as terephthalic acid, isophthalic acid, and phthalic acid, aliphatic dicarboxylic acids such as adipic acid and sebacic acid, alicyclic dicarboxylic acids such as cyclohexanedicarboxylic acid, and the like can be used. As the alcohol component, ethylene glycol, diethylene glycol, polyethylene glycol, and the like can be used.

Examples of the polyester-based polymers include poly(ethylene terephthalate) resins, poly(butylene terephthalate) resins, poly(trimethylene terephthalate) resins, poly(ethylene naphthalate) resins, poly(lactic acid) resins, and poly(butylene succinate) resins, and further include copolymers of these resins.

A fabric to be used as the substrate is preferably a fibrous substrate in terms of strength, ruggedness-forming ability, and fluid permeability. As the fibrous substrate, a long-fiber nonwoven fabric and a short-fiber nonwoven fabric can both be advantageously used. In particular, the long-fiber nonwoven fabric shows excellent penetrability when a polymer solution is poured on the substrate, thereby preventing the porous support from delaminating and preventing the composite semipermeable membrane from having unevenness or defects, e.g., pin holes, due to substrate fluffing or the like.

In addition, since tension is imposed along the direction of membrane formation in continuous production of a composite semipermeable membrane, it is preferred to use a long-fiber nonwoven fabric, which has better dimensional stability.

In terms of formability and strength, the long-fiber nonwoven fabric preferably is one in which the fibers in the surface layer on the reverse side from the porous support have been more highly longitudinally oriented than the fibers present in the surface layer on the side facing the porous support. Such a structure is preferred because this structure not only is highly effective in maintaining strength to prevent membrane breakage or the like but also enables the separation functional layer to have a stable rugged shape. More specifically, the degree of fiber orientation in that surface layer of the long-fiber nonwoven fabric which is on the reverse side from the porous support is preferably 0°-25°. It is preferable that the difference in the degree of fiber orientation between the surface layer on the reverse side from the porous support and the surface layer on the side facing the porous support should be 10°-90°.

Steps for producing a composite semipermeable membrane or for producing an element include a step of heating. A phenomenon in which the porous support or the separation functional layer shrinks occurs due to the heating. Especially in continuous membrane formation, the shrinkage is severe in the width direction, along which no tension is imposed. Since the shrinkage causes problems concerning dimensional stability, etc., substrates having a low degree of thermal dimensional change are desirable. In cases when the nonwoven fabric to be used as the substrate is one in which the difference in the degree of fiber orientation between the surface layer on the reverse side from the porous support and the surface layer on the side facing the porous support is 10°-90°, this nonwoven fabric can be prevented from thermally changing along the width direction and is hence preferred.

The "degree of fiber orientation" as used herein refers to an index which indicates the directions of the fibers of a nonwoven fabric to be used as the substrate. That term means an average angle of fibers constituting the nonwoven fabric to be used as the substrate, in cases when the direction of membrane formation in continuous membrane formation is taken as 0° and the direction perpendicular to the membrane formation direction, i.e., the width direction of the nonwoven fabric as the substrate, is taken as 90°. Consequently, the closer the degree of fiber orientation to 0°, the more the fibers are longitudinally oriented; and the closer the degree of fiber orientation to 90°, the more the fibers are transversely oriented.

The degree of fiber orientation is determined in the following manner. Ten sample pieces are randomly taken out of a nonwoven fabric to be used as the substrate, and a surface of each sample is photographed with a scanning electron microscope at a magnification of 100-1,000 times. Ten fibers are selected for each sample in the photograph, and the hundred fibers in total are each examined for angle, with the longitudinal direction of the nonwoven fabric as the substrate (machine direction, membrane formation direction) being taken as 0° and the width direction thereof (transverse direction) being taken as 90°. An average value of the measured angles is the degree of fiber orientation.

The porous support is not limited in its composition. It is, however, preferred to form the porous support from a thermoplastic resin. The term "thermoplastic resin" means a resin which is constituted of one or more chain polymeric substances and which, upon heating, shows the property of being deformed by external force of flowing.

Examples of the thermoplastic resins include homopolymers and copolymers such as polysulfones, polyethersulfones, polyamides, polyesters, cellulosic polymers, vinyl polymers, polyphenylene sulfide, polyphenylene sulfide sulfones, polyphenylene sulfones, and polyphenylene oxide. One of such polymers can be used alone, or a blend of two or more thereof can be used. The cellulosic polymers including cellulose acetate and cellulose nitrate may be used. The vinyl polymers including polyethylene, polypropylene, polyvinyl chloride, chlorinated PVC, and polyacrylonitrile may be used. Preferred of these are homopolymers or copolymers such as polysulfones, polyamides, polyesters, cellulose acetate, cellulose nitrate, polyvinyl chloride, polyacrylonitrile, polyphenylene sulfide, and polyphenylene sulfide sulfones. More preferred examples include cellulose acetate, polysulfones, polyphenylene sulfide sulfones, and polyphenylene sulfones. Of these materials, polysulfones can be generally used because this material is highly stable chemically, mechanically, and thermally and is easy to mold. The porous support preferably includes one or more of the compounds enumerated above, as a main component.

Specifically, the porous support preferably includes a polysulfone containing repeating units represented by the following chemical formula. The inclusion of this polysulfone renders pore diameter control easy and brings about high dimensional stability.

[Chem. 1]

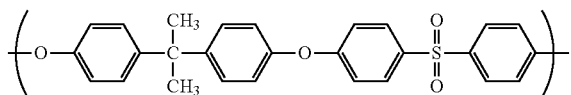

For example, an N,N-dimethylformamide (hereinafter referred to as DMF) solution of the polysulfone is cast on a substrate in a certain thickness, and the cast solution is coagulated by a wet process in water. Thus, a supporting membrane can be obtained in which most of the surface has fine pores having a diameter of 1 nm-30 nm.

The porous support has partly impregnated as stated above. It is preferable that that portion of the porous support which lies on the substrate should include an inner layer and a surface layer. The surface layer refers to a surface portion of the porous support (the portion indicated by "45" in FIG. 1), and the inner layer refers to the portion other than the surface layer, i.e., that inner portion of the porous support which lies on the substrate (the portion indicated by "40" in FIG. 1).

The inner layer of the porous support serves to transport an aqueous solution of a polyfunctional amine, which is necessary for forming a separation functional layer, to a field of polymerization. For efficient transportation of the aqueous solution of a polyfunctional amine, which is a monomer, the inner layer preferably has pores communicating with one another. The pore diameter thereof is preferably 0.1 μm-1 μm.

The surface layer, which is the surface of the porous support, provides a field of polymerization in forming a separation functional layer. The surface layer serves to hold and release the monomer to thereby supply the monomer to the separation functional layer which is being formed. The surface layer serves also as starting points for the growth of pleats of the separation functional layer.

The inner layer and the surface layer in the porous support preferably have a continuous structure. The term "continuous structure" means a structure which includes no interfacial skin layer, and indicates that channels through which a fluid flows are continuous. The term "skin layer" herein means a portion having a high density. Specifically, the skin layer has surface pores in the range of 1 nm-50 nm.

That portion of the porous support which lies on the substrate preferably has a density of 0.3 g/cm$^3$-0.7 g/cm$^3$ and a porosity of 30%-70%. In cases when the density of the porous support which lies on the substrate is 0.3 g/cm$^3$ or higher or when the porosity thereof is 30% or higher, not only suitable strength is obtained but also a surface structure suitable for the growth of pleats of the polyamide separation functional layer can be obtained. In cases when the density of the porous support which lies on the substrate is 0.7 g/cm$^3$ or less or when the porosity thereof is 70% or less, satisfactory permeability can be obtained.

A portion of the porous support lies in (or has impregnated into) the substrate. This portion of the porous support serves to tenaciously adhere the substrate and the porous support to each other to enable the substrate to support the porous support. A specific example is shown in FIG. 1. FIG. 1 is a cross-sectional view of one embodiment of the composite semipermeable membrane of the present invention.

The composite semipermeable membrane 1 shown in FIG. 1 includes a supporting membrane 2 and a separation functional layer 5. The supporting membrane 2 includes a substrate 3 and a porous support 4. The compositions and other configurations of the substrate 3 and porous support 4 may be as described above. As shown in FIG. 1, a portion of the porous support 4 lies in the substrate 3. For convenience, that portion of the porous support which lies on the substrate (between the substrate 3 and the separation functional layer 5; that is, that portion of the porous support which is exposed on the substrate 3) is designated by reference numeral 40, and that portion of the porous support which lies in the substrate (i.e., that portion of the porous support which has impregnated into the substrate 3) is designated by reference numerals 41 and 42. The layer configured of the substrate 3 and the porous support 41 and 42 which lies in the substrate (the layer remaining after the porous support 40 lying on the substrate 3 is excluded from the supporting membrane 2) is referred to as a composite substrate and designated by reference numeral 43. In this description, the term "substrate" simply means the substrate itself excluding the porous support lying in the substrate, unless otherwise indicated.

The thickness of the substrate, which supports the porous support of the present invention, is preferably 40 μm-150 μm. In cases when the thickness thereof is 40 μm or larger, more preferably 50 μm or larger, this substrate is less apt to cause excessive penetration or the like when a solution of a thermoplastic resin is poured thereon in forming a porous support on the substrate. As a result, satisfactory film-forming properties can be obtained, and a supporting membrane having high mechanical strength and excellent durability can be obtained. Meanwhile, in cases when the thickness of the substrate is 150 μm or less, more preferably 140 μm or less, a supporting membrane having a reduced thickness can be obtained, thereby contributing to space saving when it is made into a composite-semipermeable-membrane element.

The substrate preferably has a basis weight of 40 g/m$^2$-100 g/m$^2$. In cases when the basis weight thereof is 40 g/m$^2$ or larger, this substrate is less apt to cause excessive penetration or the like when a solution of a thermoplastic resin is poured thereon in forming a porous support on the substrate. As a result, satisfactory film-forming properties can be obtained, and a supporting membrane having high mechanical strength and excellent durability can be obtained. Meanwhile, in cases when the basis weight of the substrate is 100 g/m² or less, a supporting membrane having a reduced thickness can be obtained, thereby contributing to space saving when it is made into a composite-semipermeable-membrane element.

The substrate according to the present invention includes press-bonded parts due to partial thermal press bonding and a non-press-bonded part which has not undergone the partial thermal press bonding. The inclusion of the press-bonded parts improves the mechanical strength of the substrate, making it possible to obtain a supporting membrane having excellent durability.

The term "press-bonded parts" means parts which have been thermally press-bonded with a pair of rolls having ruggedness or with a roll having ruggedness and a roll having an even surface. The term "non-press-bonded part" means a part which, in the case of partial thermal press-bonding performed with a pair of rolls having ruggedness, came into contact with none of the protrusions, i.e., was located between a recess and a recess overlying said recess. In the case of partial thermal press-bonding performed with a roll having ruggedness and a roll having an even surface, that term means a part which did not come into contact with none of the protrusions of the roll having ruggedness. Even in the case where the whole of the nonwoven fabric to be used as the substrate is thermally press-bonded with a roll with an even surface before and after thermal press-bonding, any part which did not come into contact with a protrusion during the partial thermal press-bonding with a roll having ruggedness is a non-press-bonded part.

In the present invention, the thickness of the non-press-bonded part of the substrate is equal to the thickness of the substrate, and is preferably 40 μm-150 μm.

The difference in thickness between the press-bonded parts and the non-press-bonded part of the substrate is preferably 10 μm-95 μm. By regulating the difference in thickness between the press-bonded parts and the non-press-bonded part to 10 μm or larger, more preferably 15 μm or larger, a supporting membrane having improved peel strength and excellent durability can be obtained. Meanwhile, by regulating the thickness difference to 95 μm or less, more preferably 85 μm or less, a membrane can be obtained in which the membrane surface sufficiently retains channels and sufficiently produces a turbulent effect.

The press-bonded parts due to partial thermal press-bonding preferably have a fiber density of 0.8-1.0. In cases when the fiber density of the press-bonded parts is 0.8 or higher, the substrate has improved mechanical strength, making it possible to obtain a supporting membrane having excellent durability. The fiber density is determined using the following equation. Fiber density=(basis weight (g/m²))/(thickness (mm))/10³/(polymer density (g/cm³)). The calculation is made on the assumption that the poly(ethylene terephthalate) resin and the copolyester resin each have a polymer density of 1.38 g/cm³.

Due to the inclusion of the non-press-bonded part, which has not undergone partial thermal press-bonding, in the substrate, interstices are present in the substrate to allow a thermoplastic-resin solution serving as a raw material for a porous support to infiltrate into the substrate when the resin solution is poured on the substrate. The porous support is hence tenaciously bonded to the substrate, and the inside of the supporting membrane can retain permeability. In FIG. 1, the porous support lying in the non-press-bonded part of the substrate is designated by reference numeral 41, and the porous support lying in the press-bonded part of the substrate is designated by reference numeral 42.

Production of a composite-semipermeable-membrane element from a composite semipermeable membrane frequently includes a step in which the composite semipermeable membrane is wound around a cylindrical water collecting tube having many perforations, together with a raw-water channel member such as a plastic net and a permeate channel member such as tricot and optionally with a film for enhancing pressure resistance, thereby fabricating a spiral type composite-semipermeable-membrane element. In cases when the permeate channel member such as tricot is set on the substrate side of the composite semipermeable membrane and the edges of the composite semipermeable membrane are bonded with an adhesive substance, then the adhesive substance can infiltrate into the non-press-bonded part of the substrate to thereby more tenaciously bond the edges.

The fiber density of the non-press-bonded part is preferably 0.4-0.75. By regulating the fiber density of the non-press-bonded part to 0.4 or higher, more preferably 0.5 or higher, the substrate can be prevented from fluffing upon contact with process members during membrane formation to cause membrane defects. Meanwhile, by regulating the fiber density of the non-press-bonded part to 0.75 or less, the thermoplastic resin serving as a raw material for a porous support can be allowed to sufficiently infiltrate into this substrate during membrane formation to tenaciously bond the porous support to the substrate. In addition, the inside of the supporting membrane can retain permeability.

The press-bonded parts according to the present invention preferably have a shape such as a circular, elliptic, square, rectangular, parallelogrammic, rhombic, hexagonal, or octagonal shape, in terms of plan-view shape. It is preferable that such press-bonded parts are present at given intervals along both the longitudinal direction and width direction of the substrate. Such press-bonded parts which are evenly present scatteringly can reduce the strength unevenness of the substrate.

The size of each press-bonded part is preferably 0.4 mm²-5.0 mm². In cases when the size of each press-bonded part is 0.4 mm² or larger, more preferably 0.5 mm² or larger, the substrate has improved mechanical strength, making it possible to obtain a supporting membrane having excellent durability. Meanwhile, in cases when the size of each press-bonded part is 5.0 mm² or less, more preferably 3.0 mm² or less, the infiltration of the thermoplastic-resin solution, which serves as a raw material for a porous support, into this substrate during membrane formation differs only slightly from part to part, thereby enabling the porous support to be tenaciously bonded to the substrate.

The proportion of the press-bonded parts in the substrate is 50% or less per unit area of the substrate. In cases when the proportion of the press-bonded parts per unit area is 50% or less, more preferably 45% or less, not only the thermoplastic-resin solution serving as a raw material for a porous support can sufficiently infiltrate into this substrate during membrane formation to tenaciously bond the porous support to the substrate, but also permeability can be ensured.

The proportion of the press-bonded parts in the substrate is preferably 5% or larger per unit area of the substrate. In cases when the proportion of the press-bonded parts per unit area is 5% or larger, more preferably 7% or larger, this substrate has improved mechanical strength, making it possible to obtain a supporting membrane having excellent durability.

The proportion of the press-bonded parts in the substrate is more preferably 5%-50% per unit area of the substrate.

In the present invention, the weight of the porous support which has impregnated into the press-bonded parts of the substrate is 0.1 g/m²-2 g/m². In cases when the weight of the porous support lying in the press-bonded parts is 0.1 g/m² or larger, more preferably 0.2 g/m² or larger, the thermoplastic resin solution for forming a porous support is prevented from infiltrating into the substrate to reach the back surface, and the separation functional layer is hence prevented from being damaged during the steps for forming a composite semipermeable membrane. Thus, a composite semipermeable membrane having a satisfactory solute removal ratio can be obtained. Meanwhile, in cases when the weight of the porous support lying in the press-bonded parts is 2 g/m² or less, more preferably 1.5 g/m² or less, the thermoplastic-resin solution serving as a raw material for the porous support is prevented from infiltrating into the substrate to reach the back surface during membrane formation. The porous support can hence be tenaciously bonded to the substrate, and permeability can be ensured.

The weight of the porous support which has impregnated into the non-press-bonded part of the substrate is 3 g/m²-20 g/m². In cases when the weight of the porous support lying in the non-press-bonded part is 3 g/m² or larger, more preferably 5 g/m² or larger, the substrate has improved mechanical strength, making it possible to obtain a supporting membrane having excellent durability. Meanwhile, in cases when the porous support is formed so that the weight of the porous support lying in the non-press-bonded part is 20 g/m² or less, more preferably 15 g/m² or less, the thermoplastic-resin solution serving as a raw material for the porous support sufficiently infiltrates into the substrate during membrane formation. The porous support can hence be tenaciously bonded to the substrate, and permeability can be ensured.

It is preferable that the weight of the porous support lying in the substrate should satisfy the relational expression $0.005 \leq A/B \leq 0.7$, where A is the weight of the porous support which has impregnated into the press-bonded parts of the substrate and B is the weight of the porous support which has impregnated into the non-press-bonded part of the substrate. In cases when A/B is 0.005 or larger, the porous support can be tenaciously bonded to the substrate and permeability can be ensured. In cases when A/B is 0.7 or less, the thermoplastic resin solution for forming the porous support is prevented from infiltrating into the substrate to reach the back surface, and the separation functional layer is hence prevented from being damaged during the steps for forming a composite semipermeable membrane. Thus, a composite semipermeable membrane having a satisfactory solute removal ratio can be obtained.

It is more preferable that the weight A of the porous support which has impregnated into the press-bonded parts of the substrate and the weight B of the porous support which has impregnated into the non-press-bonded part of the substrate should satisfy the respective preferred numerical ranges shown above and further satisfy the relational expression.

The thickness of the supporting membrane affects the strength of the composite semipermeable membrane and the packing density of the composite semipermeable membrane incorporated into a membrane element. In order to obtain sufficient mechanical strength and packing density, the thickness of the supporting membrane is preferably in the range of 50 μm-300 μm, more preferably in the range of 60 μm-250 μm. The thickness of the porous support lying on the substrate is preferably in the range of 1 μm-200 μm, more preferably in the range of 10 μm-100 μm. The thickness of the substrate is preferably in the range of 10 μm-200 μm, more preferably in the range of 30 μm-150 μm.

(1-2) Separation Functional Layer

The separation functional layer in the composite semipermeable membrane performs the function of separating solutes. Configurations of the separation functional layer, including composition and thickness, may be set in accordance with the intended use of the composite semipermeable membrane.

(Separation Functional Layer Made of Polyamide)

The separation functional layer may include, for example, a polyamide as a main component. The polyamide for constituting the separation functional layer can be formed by the interfacial polycondensation of a polyfunctional amine with a polyfunctional acid halide. The polyfunctional amine and/or the polyfunctional acid halide preferably includes a compound having a functionality of 3 or higher.

The separation functional layer usually has a thickness which is preferably in the range of 0.01 μm-1 μm, more preferably in the range of 0.1 μm-0.5 μm, to obtain sufficient separation performance and sufficient permeation amount. The thickness of the separation functional layer can be measured in accordance with a conventional method for measuring the thicknesses of separation membranes. For example, the composite semipermeable membrane is embedded in a resin and then cut to produce an ultrathin section, and the section obtained is subjected to a treatment such as dyeing. Thereafter, the section is examined with a transmission electron microscope. Thus, the thickness of the membrane can be measured.

The term "polyfunctional amine" means an amine that has in the molecule two or more primary and/or secondary amino groups, at least one of which is a primary amino group. Examples thereof include aromatic polyfunctional amines such as phenylenediamine in which the two amino groups have been bonded to the benzene ring in the ortho, meta, or para positions, xylylenediamine, 1,3,5-triaminobenene, 1,2,4-triaminobenzene, 3,5-diaminobenzoic acid, 3-aminobenzylamine, and 4-aminobenzylamine, aliphatic amines such as ethylenediamine and propylenediamine, and alicyclic polyfunctional amines such as 1,2-diaminocyclohexane, 1,4-diaminocyclohexane, 4-aminopiperidine, and 4-aminoethylpiperazine. Among these, when the selectively separating properties, permeability, and heat resistance of the membrane are taken into account, aromatic polyfunctional amines that each have two to four primary and/or secondary amino groups in the molecule are preferred. Suitable examples of such polyfunctional aromatic amines are m-phenylenediamine, p-phenylenediamine, and 1,3,5-triaminobenzene. Because of availability and handleability, it is preferred to use m-phenylenediamine (hereinafter referred to as m-PDA) among these. One of those polyfunctional amines may be used alone, or two or more thereof may be used in combination. In the case of using two or more polyfunctional amines in combination, two or more of the amines enumerated above may be used in combination, or any of the enumerated amines may be used in combination with an amine having at least two secondary amino groups in the molecule. Examples of the amine having at least two secondary amino groups in the molecule include piperazine and 1,3-bispiperadylpropane.

The term "polyfunctional acid halide" means an acid halide having at least two halogenocarbonyl groups in the molecule. Examples of trifunctional acid halides include trimesoyl chloride, 1,3,5-cyclohexanetricarbonyl trichloride, and 1,2,4-cyclobutanetricarbonyl trichloride. Examples of bifunctional acid halides include aromatic bifunctional acid halides such as biphenyldicarbonyl dichloride, azobenzenedicarbonyl dichloride, terephthaloyl chloride, isophthaloyl chloride, and naphthalenedicarbonyl chloride, aliphatic bifunctional acid halides such as adipoyl chloride and sebacoyl chloride, and alicyclic bifunctional acid halides such as cyclopentanedicarbonyl dichloride, cyclohexanedicarbonyl dichloride, and tetrahydrofurandicarbonyl dichloride. When reactivity with the polyfunctional amine is taken into account, the polyfunctional acid halide preferably is a polyfunctional acid chloride. When the selectively separating properties and heat resistance of the membrane are taken into account, the polyfunctional acid chloride more preferably is a polyfunctional aromatic acid chloride having two to four chlorocarbonyl groups in the molecule. Because of availability and handleability, it is more preferred to use trimesoyl chloride among such aromatic acid chlorides. One of those polyfunctional acid halides may be used alone, or two or more thereof may be simultaneously used.

(Organic-Inorganic Hybrid Separation Functional Layer)

The separation functional layer may have an organic-inorganic hybrid structure containing, for example, silicon (Si) element. The separation functional layer having an organic-inorganic hybrid structure can contain, for example, the following compounds (A) and (B).

(A) A silicon compound including a silicon atom to which both a reactive group having an ethylenically unsaturated group and a hydrolyzable group have been directly bonded.

(B) A compound which has an ethylenically unsaturated group and is not the compound (A).

Specifically, the separation functional layer may include a product of condensation of the hydrolyzable group of compound (A) and a product of polymerization of the ethylenically unsaturated group of compound (A) and/or compound (B). That is, the separation functional layer can include at least one polymer selected from among a polymer formed by condensing and/or polymerizing compound (A) alone, a polymer formed by polymerizing compound (B) alone, and a copolymer of compound (A) and compound (B).

The polymers include condensates. In the copolymer of compound (A) and compound (B), the compound (A) may have been condensed through the hydrolyzable group.

The hybrid structure can be formed by known methods. An example of methods for forming the hybrid structure is as follows. A liquid reaction mixture containing compound (A) and compound (B) is applied to a supporting membrane. The excess reaction mixture is removed, and the hydrolyzable group is then condensed by a heat treatment. For polymerizing the ethylenically unsaturated groups of compounds (A) and (B), a heat treatment, electromagnetic-wave irradiation, electron beam irradiation, or plasma irradiation may be used. A polymerization initiator, a polymerization accelerator, or the like can be added in forming the separation functional layer in order to heighten the rate of polymerization.

Whichever separation functional layer is to be formed, the surface of the supporting membrane may be hydrophilized with, for example, an alcohol-containing aqueous solution or an aqueous alkali solution before use.

2. Process for Producing the Composite Semipermeable Membrane

A process for producing the composite semipermeable membrane is explained next. The production process includes a step of forming a supporting membrane and a step of forming a separation functional layer.

(2-1) Step of Forming Supporting Membrane

The step of forming a supporting membrane may include: a step in which a solution of a thermoplastic resin, which is a component for forming a porous support, is applied to a substrate; and a step in which the substrate to which the solution has been applied is immersed in a coagulating bath in which the thermoplastic resin has lower solubility than in good solvents for the thermoplastic resin, thereby coagulating the thermoplastic resin to form a three-dimensional network structure. The step of forming a supporting membrane may further include a step in which the thermoplastic resin that is a component for forming a porous support is dissolved in a good solvent therefor to prepare a thermoplastic-resin solution.

The supporting membrane in the present invention is configured of a substrate and a porous support formed in the substrate and on one or both surfaces of the substrate. Such a structure can be formed by applying a solution of the thermoplastic resin to the substrate or by immersing the substrate in a solution of the thermoplastic resin.

The application of the thermoplastic-resin solution to the substrate can be carried out by various coating techniques. It is, however, preferred to use a pre-metering coating technique capable of feeding a coating fluid in a precise amount, such as die coating, slide coating, or curtain coating. It is more preferred to use a slit die method for applying the thermoplastic-resin solution in forming the supporting membrane according to the present invention.

In the case where the thermoplastic-resin solution contains a polysulfone, the polysulfone concentration (i.e., solid concentration) is preferably 15% by weight or higher, more preferably 17% by weight or higher. The polysulfone concentration of the thermoplastic-resin solution is preferably 30% by weight or less, more preferably 25% by weight or less. In cases when the polysulfone concentration is 15% by weight or higher, this thermoplastic-resin solution, through phase separation, forms pores, through which an aqueous amine solution can be supplied in forming a polyamide separation functional layer. In cases when the polysulfone concentration is 30% by weight or less, a structure having permeability can be obtained. Polysulfone concentrations within that range are preferred from the standpoint of the performance and durability of the composite semipermeable membrane.

In the case of using a polysulfone, the temperature of the thermoplastic-resin solution at the time of application thereof is usually preferably in the range of 10-60° C. So long as the temperature thereof is within that range, the thermoplastic-resin solution suffers no precipitation and the organic-solvent solution containing the thermoplastic resin sufficiently infiltrates into interstices among the fibers of the substrate, before being solidified. The infiltration enables the porous support to be tenaciously bonded to the substrate, and a supporting membrane according to the present invention can be obtained. The preferred range of the temperature of the thermoplastic-resin solution may be suitably regulated in accordance with the viscosity of the thermoplastic-resin solution to be used, etc.

The polymer to be contained in the thermoplastic-resin solution can be suitably regulated while taking account of various properties of the supporting membrane to be produced, such as strength properties, permeation properties, and surface properties.

The solvent contained in the thermoplastic resin solution may be a single solvent or a mixed solvent as long as the solvent is a good solvent for the polymer.

The solvent can be suitably adjusted while taking account of the strength properties of the supporting membrane to be produced and the infiltration of the thermoplastic-resin solution into the substrate.

The term "good solvent" as used in the present invention means a solvent in which the polymeric material dissolves. Examples of the good solvent include N-methyl-2-pyrrolidone (NMP), tetrahyrofuran, dimethyl sulfoxide, amides such as tetramethylurea, dimethylacetamide, and dimethylformamide, lower alkyl ketones such as acetone and methyl ethyl ketone, esters and lactones such as trimethyl phosphate and γ-butyrolactone, and mixed solvents composed of two or more thereof.

Examples of nonsolvents for the polymer include: water; aliphatic hydrocarbons, aromatic hydrocarbons, and aliphatic alcohols, such as hexane, pentane, benzene, toluene, methanol, ethanol, trichloroethylene, ethylene glycol, diethylene glycol, triethylene glycol, propylene glycol, butylene glycol, pentanediol, hexanediol, and low-molecular-weight polyethylene glycol; and mixed solvents composed of two or more thereof.

The thermoplastic-resin solution may contain additives for regulating the pore diameter, porosity, hydrophilicity, elastic modulus, and other properties of the porous support. Examples of additives for regulating the pore diameter and porosity include, but are not limited to, water, alcohols, water-soluble polymers such as polyethylene glycol, polyvinylpyrrolidone, poly(vinyl alcohol), and poly(acrylic acid), salts of such water-soluble polymers, inorganic salts such as lithium chloride, sodium chloride, calcium chloride, and lithium nitrate, formaldehyde, and formamide. Examples of additives for regulating the hydrophilicity and elastic modulus include various surfactants.

Although the thermoplastic-resin solution applied to the substrate in the manner described above infiltrates into the substrate, it is necessary to control the infiltration of the thermoplastic-resin solution into the substrate for obtaining a supporting membrane having a given structure. Examples of methods for controlling the infiltration of the thermoplastic-resin solution into the substrate include: a method in which the time period from application of the thermoplastic-resin solution to the substrate to immersion in a coagulating bath is controlled; and a method in which the viscosity of the thermoplastic-resin solution is regulated by controlling the temperature or concentration of the solution. These methods can be used in combination.

The time period from application of the thermoplastic-resin solution to the substrate to immersion in a coagulating bath is usually preferably in the range of 0.1-5 seconds. In cases when the time period to immersion in a coagulating bath is within that range, the thermoplastic-resin solution sufficiently infiltrates into interstices among the fibers of the substrate before being solidified. The preferred range of the time period to immersion in a coagulating bath may be suitably adjusted in accordance with the viscosity of the thermoplastic-resin solution to be used, etc.

Water is usually used as the coagulating bath. However, any coagulating bath in which the polymer does not dissolve may be used. The membrane morphology of the supporting membrane changes depending on the composition, and the property of forming a composite semipermeable membrane changes accordingly. The temperature of the coagulating bath is preferably −20° C. to 100° C., more preferably 10° C.-30° C. In cases when the temperature thereof is not higher than the upper limit, this coagulating bath does not suffer sever surface vibrations due to thermal movement, and the membrane thus formed has satisfactory surface smoothness. Meanwhile, in cases when the temperature thereof is not below the lower limit, a sufficient coagulation rate is obtained, resulting in satisfactory membrane formation efficiency.

The supporting membrane thus obtained is then preferably washed with hot water in order to remove the membrane formation solvent remaining in the membrane. The temperature of this hot water is preferably 50° C.-100° C., more preferably 60° C.-95° C. In case where the temperature of the hot water is higher than the upper limit, the supporting membrane has an increased degree of shrinkage, resulting in a decrease in permeability. Conversely, in case where the temperature thereof is lower than lower limit, the washing effect is too low.

(2-2) Step of Forming Separation Functional Layer

The step of forming a separation functional layer, which is a component of the composite semipermeable membrane, is explained using, as an example thereof, formation of a layer including a polyamide as a main component (that is, a polyamide separation functional layer). The step of forming a polyamide separation functional layer includes using both an aqueous solution containing the polyfunctional amine and a solution of the polyfunctional acid halide in a water-immiscible organic solvent to perform interfacial polycondensation on a surface of the supporting membrane to thereby form a polyamide framework.

The concentration of the polyfunctional amine in the aqueous polyfunctional-amine solution is preferably in the range of 0.1%-20% by weight, more preferably in the range of 0.5%-15% by weight. In cases when the concentration thereof is within that range, sufficient permeability and the ability to sufficiently remove salts and boron can be obtained.

The aqueous polyfunctional-amine solution may contain a surfactant, organic solvent, alkaline compound, antioxidant, and the like so long as these components do not interfere with the reaction between the polyfunctional amine and the polyfunctional acid halide. Surfactants have the effects of improving the wettability of the surface of the supporting membrane and reducing the interfacial tension between the aqueous amine solution and the nonpolar solvent. Some organic solvents act as a catalyst for the interfacial polycondensation reaction, and hence there are cases where addition of an organic solvent enables the interfacial polycondensation reaction to be efficiently conducted.

In order to perform the interfacial polycondensation on the supporting membrane, the aqueous solution of the polyfunctional amine is first brought into contact with the supporting membrane. The contact with the surface of the supporting membrane is preferably performed evenly and continuously. Specific examples include a method in which the aqueous polyfunctional-amine solution is applied to the supporting membrane and a method in which the supporting membrane is immersed in the aqueous polyfunctional-amine solution. The time period during which the supporting membrane is in contact with the aqueous polyfunctional-amine solution is preferably in the range of 5 seconds to 10 minutes, more preferably in the range of 10 seconds to 3 minutes.

After the aqueous polyfunctional-amine solution is brought into contact with the supporting membrane, the excess aqueous solution is thoroughly remove so that no droplets remain on the membrane surface. By thoroughly removing the excess solution, it is possible to avoid degradation of the removal performance of the composite semipermeable membrane caused by droplets remaining portions after the formation of a composite semipermeable membrane. As a method for removing the excess solution, for example, a method in which the supporting membrane which has been contacted with the aqueous polyfunctional-amine solution is held vertically to allow the excess aqueous solution to flow down naturally, as described in JP-A-2-78428, or a method in which streams of a gas, e.g., nitrogen, are blown against the supporting membrane from air nozzles to forcedly remove the excess solution can be used. In addition, after the removal of the excess solution, the membrane surface may be dried to remove some of the water contained in the aqueous solution.

Subsequently, a solution of a polyfunctional acid halide in a water-immiscible organic solvent is brought into contact with the supporting membrane which has been contacted with the aqueous polyfunctional-amine solution, thereby forming a crosslinked-polyamide separation functional layer through interfacial polycondensation.

The concentration of the polyfunctional acid halide in the solution in a water-immiscible organic solvent is preferably in the range of 0.01%-10% by weight, more preferably in the range of 0.02%-2.0% by weight. In cases when the concentration of the polyfunctional acid halide is 0.01% by weight or higher, a sufficiently high reaction rate is obtained. In cases when the concentration thereof is 10% by weight or less, the occurrence of side reactions can be prevented. It is more preferred to incorporate an acylation catalyst such as DMF into the organic-solvent solution, because the interfacial polycondensation is accelerated.

The water-immiscible organic solvent desirably is one in which the polyfunctional acid halide dissolves and which does not damage the supporting membrane, and may be any such solvent which is inert to both the polyfunctional amine compound and the polyfunctional acid halide. Preferred examples thereof include hydrocarbons such as hexane, heptane, octane, nonane, and decane.

For bringing the organic-solvent solution containing a polyfunctional acid halide into contact with the supporting membrane, the same method as that used for coating the supporting membrane with the aqueous polyfunctional-amine solution may be used.

It is important in the interfacial polycondensation step that the surface of the supporting membrane should be sufficiently covered with a thin crosslinked-polyamide film and that the contacted water-immiscible-organic-solvent solution containing a polyfunctional acid halide should be kept remaining on the supporting membrane. Consequently, the time period of conducting the interfacial polycondensation is preferably 0.1 second to 3 minutes, more preferably 0.1 second to 1 minute. In cases when the time period of conducting the interfacial polycondensation is 0.1 second to 3 minutes, the surface of the supporting membrane can be sufficiently covered with a thin crosslinked-polyamide film and the organic-solvent solution containing a polyfunctional acid halide can be held on the supporting membrane.

After a polyamide separation functional layer is thus formed on the supporting membrane by the interfacial polycondensation, the excess solvent is removed. For removing the excess solvent, for example, a method in which the membrane is held vertically to allow the excess organic solvent to flow down naturally and be thus removed, can be used. In this case, the time period of vertically holding the membrane is preferably 1 minute-5 minutes, more preferably 1 minute-3 minutes. In cases when the time period of the holding is within that range, a separation functional layer is sufficiently formed and the organic solvent is not excessively dried. The resultant composite semipermeable membrane hence has no vacant spots where the polyamide separation functional layer is absent, and shows sufficiently high membrane performance.

The composite semipermeable membrane thus obtained is washed with hot water in order to remove the monomers remaining in the membrane. The temperature of this hot water is preferably 30° C.-100° C., more preferably 45° C.-95° C. In case where the temperature thereof is higher than the upper limit, the composite semipermeable membrane has an increased degree of shrinkage, resulting in a decrease in permeability. Conversely, in case where the temperature thereof is lower than the lower limit, the washing effect is too low. A chemical treatment with chlorine, an acid, an alkali, nitrous acid, or the like may be given to the composite semipermeable membrane according to need in order to enhance the separation performance and permeability.

3. Use of the Composite Semipermeable Membrane

The composite semipermeable membrane thus produced can be used to fabricate a spiral type composite-semipermeable-membrane element by winding the composite semipermeable membrane around a cylindrical water collecting tube having many perforations, together with a raw-water channel member such as a plastic net and a permeate channel member such as tricot and optionally with a film for enhancing pressure resistance. Such elements can be connected serially or in parallel and disposed in a pressure vessel, thereby configuring a composite-semipermeable-membrane module.

Furthermore, the composite semipermeable membrane or the composite-semipermeable-membrane element or composite-semipermeable-membrane module can be combined with a pump for supplying raw water thereto, a device for pretreating the raw water, etc., thereby configuring a fluid separator. By using this separator, raw water can be separated into a permeate such as drinking water and a concentrate which has not passed through the membrane. Thus, water suited for a purpose can be obtained.

Higher operating pressures for the fluid separator improve the salt removal performance, but result in an increase in the amount of energy necessary for the operation. Because of this and in view of the durability of the composite semipermeable membrane, the operating pressure at the time when water to be treated is passed through the composite semipermeable membrane is preferably 1.0 MPa-10 MPa. The term "operating pressure" means the so-called trans-membrane pressure difference. Higher feed-water temperatures result in a decrease in salt removal performance, whereas the membrane permeation flux decreases as the feed-water temperature declines. Consequently, the temperature of the feed water is preferably 5° C.-45° C. With respect to the pH of the feed water, high pH values may result in the occurrence of scales of magnesium and other substances in the case of high-salt-concentration feed water such as seawater. In addition, there is the fear of membrane deterioration due to high-pH operation. It is hence preferred to operate the fluid separator in a neutral region.

Examples of the raw water to be treated with the composite semipermeable membrane include liquid mixtures containing a TDS (total dissolved solids) of 500 mg/L to 100 g/L, such as seawater, brackish water, and wastewater. In general, TDS, which is the total content of dissolved solids, is expressed in "weight/volume" or is expressed in "weight ratio" on the assumption that the weight of one liter of the raw water is regarded as 1 kg. According to a definition, TDS can be calculated from the weight of a residue remaining after a solution filtered through a 0.45-μm filter is vaporized at a temperature of 39.5° C.-40.5° C. In a simpler way, practical salinity is converted to TDS.

EXAMPLES

The present invention will be explained below in more detail by reference to Examples, but the present invention is not limited by the following Examples in any way.

<Basis Weight (g/m²) of Substrate>

Three composite semipermeable membrane pieces each having a size of 30 cm×50 cm were taken out, and the supporting membrane was removed from the composite semipermeable membrane by dissolution in DMF. Thereafter, the weight of the nonwoven fabric as the substrate of each sample was measured, and an average of the obtained values was converted to weight per unit area. This value per unit area was rounded off to the nearest whole number to determine the basis weight of the substrate.

<Thicknesses (Mm) of Press-Bonded Part and Non-Press-Bonded Part of Substrate>

The supporting membrane was removed from a composite semipermeable membrane by dissolution, and fifty sample pieces were randomly taken out of the nonwoven fabric which was the substrate. A photograph of a cross-section of each sample was taken with a scanning electron microscope at a magnification of 50-300 diameters. The thickness of a press-bonded part and that of a non-press-bonded part were measured for each sample. An average of the measured values for each part was rounded off to the nearest hundredth to determine the thickness. With respect to the thickness of the press-bonded part, the thickness of the thinnest portion in the press-bonded part was measured. With respect to the thickness of the non-press-bonded part, the thickness of the thickest portion in the non-press-bonded part was measured.

<Measurement of Weight of Porous Support in Substrate>

Five sample pieces were cut out of a composite semipermeable membrane. A tape having high pressure-sensitive adhesive properties was applied to the surface of the membrane in each sample piece to peel the porous support from the substrate. Thus, a composite substrate (the part indicated by "43" in FIG. 1) configured of the substrate and the porous support which had impregnated into the substrate was obtained.

About 2 cm² of a press-bonded part and about 2 cm² of a non-press-bonded part were cut out of each of the five sample pieces, and were dried at 130° C. for 3 hours. After the drying, the weights thereof were measured.

Next, the dried composite substrate was immersed in DMF solution for 3 hours or longer to dissolve away the porous support lying in the substrate. Thus, the substrate only was taken out of the composite substrate. Thereafter, this substrate was washed with pure water and then dried at 130° C. for 3 hours. The weight of the thus-obtained substrate was measured.

The weight of the porous support lying in the substrate was determined from the difference between the weight of the composite substrate and the weight of the substrate.

The value obtained was converted to a value per unit area. An average value was determined.

<Ratio of Weight a of Porous Support in Press-Bonded Part of Substrate to Weight B of Porous Support in Non-Press-Bonded Part of Substrate, A/B>

A/B was calculated from the weight A of the porous support lying in the press-bonded part of the substrate and from the weight B of the porous support lying in the non-press-bonded part of the substrate.

<Salt Removal Ratio (TDS Removal Ratio)>

Seawater (i.e., feed water) having a temperature of 25° C. and a pH of 6.5 was supplied to a composite semipermeable membrane at an operating pressure of 5.5 MPa to thereby perform a filtration treatment over 24 hours. The permeate thus obtained was subjected to a measurement of TDS removal ratio.

The feed water and the permeate were examined for electrical conductivity with an electrical conductivity meter manufactured by Toa Electronics Ltd., thereby obtaining a practical salinity. This practical salinity was converted to a TDS concentration, from which a salt removal ratio, i.e., a TDS removal ratio, was determined using the following equation.

TDS removal ratio (%)=100×{1−[(TDS concentration in permeate)/(TDS concentration in feed water)]}

A composite semipermeable membrane which showed a TDS removal ratio of 99.80% or higher was rated as having excellent salt removal performance and indicated by "A"; a composite semipermeable membrane which showed a TDS removal ratio of 99.60% or higher but less than 99.80% was rated as having good salt removal performance and indicated by "B"; a composite semipermeable membrane which showed a TDS removal ratio of 99.00% or higher but less than 99.60%, which was below the desired values, was rated as poor in salt removal performance and indicated by "C"; and a composite semipermeable membrane which showed a TDS removal ratio less than 99.00% was rated as unusable and indicated by "D". "A" and "B" indicate acceptable levels.

<Membrane Permeation Flux>

The amount of the permeate obtained by the 24-hour filtration treatment was converted to permeate amount (m³) per m² of the membrane area per day, which was taken as membrane permeation flux (m³/m²/day).

A composite semipermeable membrane which had a membrane permeation flux of 1.00 m³/m²/day or higher was rated as exceedingly efficiently permeable and indicated by "A"; a composite semipermeable membrane which had a membrane permeation flux of 0.60 m³/m²/day or higher but less than 1.00 m³/m²/day was rated as efficiently permeable and indicated by "B"; a composite semipermeable membrane which had a membrane permeation flux of 0.45 m³/m²/day or higher but less than 0.60 m³/m²/day, which was below the desired values, was rated as poor in permeation performance and indicated by "C"; and a composite semipermeable membrane which had a membrane permeation flux less than 0.45 m³/m²/day was rated as unusable and indicated by "D". "A" and "B" indicate acceptable levels.

<Durability Test>

The composite semipermeable membranes obtained in the Comparative Examples and the Examples were examined for various properties in the following manner. An aqueous sodium chloride solution (i.e., feed water) adjusted to have a concentration of 1,500 ppm, temperature of 25° C., and pH of 6.5 was supplied to each composite semipermeable membrane at an operating pressure of 1.55 MPa to conduct a membrane filtration treatment for 24 hours. During the 24-hour membrane filtration treatment, the salt removal ratio and the membrane permeation flux were determined (initial performance). Thereafter, 1% by weight calcium carbonate was added to the feed water, and the filtration treatment was conducted for further 3 hours. Subsequently, the feed water containing calcium carbonate within the device was discharged, and the inside of the device was washed with pure water. An aqueous sodium chloride solution adjusted to have a concentration of 1,500 ppm, temperature of 25° C., and pH of 6.5 was then supplied again at an operating pressure of 1.55 MPa to conduct a membrane filtration treatment for 1 hour. During this 1-hour membrane filtration treatment, the salt removal ratio and the membrane permeation flux were determined again (performance after durability test).

<Durability>

Peel strength was measured as durability with a Tensilon tester (RTG-1210). Specifically, ten strips were cut out of a fresh membrane sample which had undergone neither pressure application nor water passing. Each strip was subjected at 25° C. to 180° peeling performed at a chuck traveling speed of 10 mm/min to determine a maximum value of peel force. An average of the ten values obtained was calculated to thereby obtain the peel strength.

A membrane having a peel strength of 1.20 N/25 mm or higher was rated as having exceedingly high durability and indicated by "A"; a membrane having a peel strength of 0.70 N/25 mm or higher but less than 1.20 N/25 mm was rated as having high durability and indicated by "B"; a membrane having a peel strength of 0.30 N/25 mm or higher but less than 0.70 N/25 mm, which was below the desired values, was rated as poor in durability and indicated by "C"; and a membrane having a peel strength less than 0.30 N/25 mm was rated as unusable and indicated by "D". "A" and "B" indicate acceptable levels.

Example 1

A DMF solution with 16% by weight of a polysulfone was kept being heated at 90° C. for 2 hours with stirring, thereby preparing a thermoplastic-resin solution.

The polysulfone used in the Examples was Polysulfone UDEL p-3500, manufactured by Solvay Advanced Polymers, LLC.

The thermoplastic-resin solution thus prepared was cooled to room temperature and fed to an extruder, where the solution was subjected to high-accuracy filtration. The filtered thermoplastic-resin solution was cast in a thickness of 180 μm on a substrate made of long polyester fibers (fiber diameter, 1 dtex; thickness, about 90 μm; air permeability, 1 cc/cm$^2$/sec; degrees of fiber orientation, 40° in surface layer on the side facing the porous support and 20° in surface layer on reverse side from the porous support; basis weight, 75.4 g/m$^2$; thickness of press-bonded parts, 56 μm; thickness of non-press-bonded parts, 84 μm; proportion of press-bonded parts, 21%; size of press-bonded parts, 3 mm$^2$) via a slit die. Immediately thereafter, the coated substrate was immersed in pure water and washed for 5 minutes, thereby producing a supporting membrane.

A composite-semipermeable-membrane production apparatus equipped with an unwinder and a winder and having five slit-shaped discharge ports and two slit-shaped suction ports was used to apply an aqueous solution with 4.5% by weight of m-phenylenediamine to the supporting membrane which was being conveyed from roll to roll.

Subsequently, on the supporting membrane which had been contacted with the aqueous polyfunctional-amine solution, an n-decane solution (25° C.) of polyfunctional acid halides which had been prepared so as to have a total polyfunctional acid halide content of 0.16% by weight and to contain trimesoyl chloride and terephthaloyl chloride in a ratio of 80/20 by mole was applied with a slot die coater so that the surface of the membrane was completely wetted. At one minute after the application of the n-decane solution of polyfunctional acid halides, the excess solution was removed from the membrane with an air-knife. Thereafter, the coated supporting membrane was washed with 70° C. hot water for 2 minutes to obtain a composite semipermeable membrane.

Example 2

A composite semipermeable membrane of Example 2 was produced in the same manner as in Example 1, except that as the substrate of the supporting membrane, a substrate which had a basis weight of 74.3 g/m$^2$ and in which the press-bonded parts had a thickness of 61 μm, was used.

Example 3

A composite semipermeable membrane of Example 3 was produced in the same manner as in Example 1, except that as the substrate of the supporting membrane, a substrate which had a basis weight of 76.2 g/m$^2$ and in which the press-bonded parts had a thickness of 67 μm.

Example 4

A composite semipermeable membrane of Example 4 was produced in the same manner as in Example 1, except that as the substrate of the supporting membrane, a substrate in which the press-bonded parts had a size of 2 mm$^2$ was used.

Example 5

A composite semipermeable membrane of Example 5 was produced in the same manner as in Example 1, except that as the substrate of the supporting membrane, a substrate in which the press-bonded parts had a size of 4 mm$^2$ was used.

Example 6

A composite semipermeable membrane of Example 6 was produced in the same manner as in Example 1, except that as the substrate of the supporting membrane, a substrate in which the proportion of press-bonded parts was 15% was used.

Example 7

A composite semipermeable membrane of Example 7 was produced in the same manner as in Example 1, except that as the substrate of the supporting membrane, a substrate in which the proportion of press-bonded parts was 41% was used.

Example 8

A composite semipermeable membrane of Example 8 was produced in the same manner as in Example 1, except that as the substrate of the supporting membrane, a substrate which had a basis weight of 95.6 g/m$^2$ and in which the press-bonded parts had a thickness of 81 μm and the non-press-bonded parts had a thickness of 95 μm was used.

Example 9

A composite semipermeable membrane of Example 9 was produced in the same manner as in Example 1, except that as the substrate of the supporting membrane, a substrate which had a basis weight of 48.8 g/m² and in which the press-bonded parts had a thickness of 36 μm and the non-press-bonded parts had a thickness of 56 μm was used.

Comparative Example 1

A composite semipermeable membrane of Comparative Example 1 was produced in the same manner as in Example 1, except that as the substrate of the supporting membrane, a substrate which had a basis weight of 75.3 g/m² and in which the non-press-bonded parts had a thickness of 84 μm and the proportion of press-bonded parts was 0% was used.

Comparative Example 2

A composite semipermeable membrane of Comparative Example 2 was produced in the same manner as in Example 1, except that as the substrate of the supporting membrane, a substrate which had a basis weight of 75.5 g/m² and in which a press-bonded part occupied the whole area (100%) and the press-bonded part had a thickness of 55 μm was used.

Comparative Example 3

A composite semipermeable membrane of Comparative Example 3 was produced in the same manner as in Example 1, except that as the substrate of the supporting membrane, a substrate which had a basis weight of 75 g/m² and in which the proportion of press-bonded parts was 60% was used.

Comparative Example 4

A composite semipermeable membrane of Comparative Example 4 was produced in the same manner as in Example 1, except that as the substrate of the supporting membrane, a substrate which had a basis weight of 122.1 g/m² and in which the press-bonded parts had a thickness of 100 μm and the non-press-bonded parts had a thickness of 250 μm was used.

Comparative Example 5

A composite semipermeable membrane of Comparative Example 5 was produced in the same manner as in Example 1, except that as the substrate of the supporting membrane, a substrate which had a basis weight of 26.5 g/m² and in which the press-bonded parts had a thickness of 60 μm and the non-press-bonded parts had a thickness of 63 μm was used.

<Results>

The results obtained above are shown in Table 1. In Examples 1 to 9, composite semipermeable membranes each having both high peeling resistance of 0.7 N/25 mm or higher and high permeability were obtained.

Meanwhile, the composite semipermeable membranes of Comparative Examples 2 and 3 each had a low peel strength and a low permeation flux because of the high bulk density of the substrate, although these membranes attained high salt removal ratios. The composite semipermeable membranes of Comparative Examples 4 and 5 each had a high peel strength and a high permeation flux but were low in salt removal ratio (TDS removal ratio), because of the high porosity of the substrate. This is thought to be because the exceedingly high proportion of pores of the substrate to the overall volume of the substrate (the proportion can be calculated from the basis weight and thickness of the substrate) had resulted in an increased amount of the porous support impregnated into the substrate and this had resulted in an impaired balance, in forming the separation functional layer, between the transportation of the aqueous polyfunctional-amine solution to the field of polymerization and the rate of polymerization, resulting in insufficient formation of pleats.

TABLE 1

| | Substrate | | | | | | | | | |
|---|---|---|---|---|---|---|---|---|---|---|
| | | | | | Thickness | | Press-bonded parts | | Thermoplastic resin | |
| | | | | Basis | Press-bonded parts | Non-press-bonded parts | Areal | Size | | Specific | Concentration |
| | Shape | Material | Specific gravity | weight (g/m²) | (μm) | (μm) | proportion (%) | (mm²/part) | Material | gravity | (wt %) |
| Example 1 | long-fiber | polyester | 1.38 | 75.4 | 56 | 84 | 21 | 3 | PSf | 1.24 | 16 |
| Example 2 | long-fiber | polyester | 1.38 | 74.3 | 61 | 84 | 21 | 3 | PSf | 1.24 | 16 |
| Example 3 | long-fiber | polyester | 1.38 | 76.2 | 67 | 84 | 21 | 3 | PSf | 1.24 | 16 |
| Example 4 | long-fiber | polyester | 1.38 | 75.4 | 56 | 84 | 21 | 2 | PSf | 1.24 | 16 |
| Example 5 | long-fiber | polyester | 1.38 | 75.4 | 56 | 84 | 21 | 4 | PSf | 1.24 | 16 |
| Example 6 | long-fiber | polyester | 1.38 | 75.4 | 56 | 84 | 15 | 3 | PSf | 1.24 | 16 |
| Example 7 | long-fiber | polyester | 1.38 | 75.4 | 56 | 84 | 41 | 3 | PSf | 1.24 | 16 |
| Example 8 | long-fiber | polyester | 1.38 | 95.6 | 81 | 95 | 21 | 3 | PSf | 1.24 | 16 |
| Example 9 | long-fiber | polyester | 1.38 | 48.8 | 36 | 56 | 21 | 3 | PSf | 1.24 | 16 |
| Comparative Example 1 | long-fiber | polyester | 1.38 | 75.3 | 84 | 84 | 0 | — | PSf | 1.24 | 16 |
| Comparative Example 2 | long-fiber | polyester | 1.38 | 75.5 | 55 | 55 | whole area | — | PSf | 1.24 | 16 |
| Comparative Example 3 | long-fiber | polyester | 1.38 | 75 | 56 | 84 | 60 | 3 | PSf | 1.24 | 16 |
| Comparative Example 4 | long-fiber | polyester | 1.38 | 122.1 | 100 | 250 | 21 | 3 | PSf | 1.24 | 16 |
| Comparative Example 5 | long-fiber | polyester | 1.38 | 26.5 | 60 | 63 | 21 | 3 | PSf | 1.24 | 16 |

TABLE 1-continued

| | Weight of porous support in substrate | | | Durability | | Performance of composite semipermeable membrane | | | |
| | Press-bonded parts, A | Non-press-bonded parts, B | | Peel strength | | TDS removal ratio | | Permeation flux | |
| | (g/m$^2$) | (g/m$^2$) | 0.005 ≤ A/B ≤ 0.7 | (N/25 mm) | Rating | (%) | Rating | (m$^3$/m$^2$/day) | Rating |
|---|---|---|---|---|---|---|---|---|---|
| Example 1 | 0.22 | 4.70 | 0.046 | 1.11 | B | 99.82 | A | 0.93 | B |
| Example 2 | 1.15 | 4.83 | 0.237 | 1.15 | B | 99.84 | A | 0.95 | B |
| Example 3 | 1.89 | 4.61 | 0.409 | 1.08 | B | 99.79 | B | 0.96 | B |
| Example 4 | 0.22 | 4.70 | 0.046 | 1.11 | B | 99.81 | A | 0.93 | B |
| Example 5 | 0.22 | 4.70 | 0.046 | 1.11 | B | 99.78 | B | 0.93 | B |
| Example 6 | 0.22 | 4.70 | 0.046 | 1.11 | B | 99.83 | A | 0.91 | B |
| Example 7 | 0.22 | 4.70 | 0.046 | 1.12 | B | 99.85 | A | 0.91 | B |
| Example 8 | 1.88 | 4.12 | 0.456 | 0.95 | B | 99.81 | A | 0.82 | B |
| Example 9 | 0.10 | 3.30 | 0.031 | 0.81 | B | 99.72 | B | 1.01 | A |
| Comparative Example 1 | 4.71 | 4.71 | 1.000 | 1.13 | B | 99.62 | B | 0.59 | C |
| Comparative Example 2 | 0.05 | 0.05 | 1.000 | 0.24 | D | 99.31 | C | 0.41 | D |
| Comparative Example 3 | 0.26 | 4.74 | 0.056 | 0.51 | C | 99.53 | C | 0.50 | C |
| Comparative Example 4 | 1.84 | 25.84 | 0.071 | 2.4 | A | 91.33 | D | 0.81 | B |
| Comparative Example 5 | 6.53 | 7.01 | 0.932 | 1.4 | B | 94.78 | D | 1.23 | A |

As Table 1 shows, it can be seen that the composite semipermeable membranes of Examples 1 to 9 each have high permeability and high salt removal performance and can retain the excellent membrane performance and salt removal ratio even under such operating conditions that the membrane receives physical external force due to impacts, abrasion, etc.

While the present invention has been described in detail and with reference to specific embodiments thereof, it will be apparent to one skilled in the art that various changes and modifications can be made therein without departing from the spirit and scope thereof. This application is based on a Japanese patent application filed on Sep. 28, 2015 (Application No. 2015-189491), the contents thereof being incorporated herein by reference.

INDUSTRIAL APPLICABILITY

The composite semipermeable membrane of the present invention is especially suitable for use in desalting brackish water or seawater.

DESCRIPTION OF REFERENCE NUMERALS AND SIGNS

1: Composite semipermeable membrane
2: Supporting membrane
3: Substrate
4: Porous support
40: Porous support lying on substrate
41: Porous support lying in non-press-bonded part of substrate
42: Porous support lying in press-bonded part of substrate
43: Composite substrate
45: Surface layer of porous support
5: Separation functional layer

The invention claimed is:

1. A composite semipermeable membrane comprising a substrate, a porous support provided on the substrate, and a separation functional layer disposed on the porous support, wherein
   the substrate has a structure comprising press-bonded parts and non-press-bonded parts, the press-bonded parts being present in a proportion of up to 50% per unit area of the substrate,
   the porous support impregnated into the press-bonded parts of the substrate has a weight of 0.1 g/m$^2$-2 g/m$^2$, and the porous support impregnated into the non-press-bonded parts of the substrate has a weight of 3 g/m$^2$-20 g/m$^2$.

2. The composite semipermeable membrane according to claim 1, wherein a proportion of the press-bonded parts of the substrate is 5%-50% per unit area of the substrate.

3. The composite semipermeable membrane according to claim 1, wherein a weight A of the porous support which has impregnated into the press-bonded parts of the substrate and a weight B of the porous support which has impregnated into the non-press-bonded parts of the substrate satisfy a relational expression 0.005≤A/B≤0.7.

4. The composite semipermeable membrane according to claim 1, wherein the non-press-bonded parts of the substrate have a thickness of 40 μm-150 μm, the substrate has a basis weight of 40 g/m$^2$-100 g/m$^2$, and the substrate comprises a polyester as a main component.

5. The composite semipermeable membrane according to claim 1, wherein a difference in thickness between the press-bonded parts and the non-press-bonded parts of the substrate is 10 μm-95 μm.

6. The composite semipermeable membrane according to claim 1, wherein the separation functional layer comprises a polyamide.

* * * * *